(12) United States Patent
Yokota et al.

(10) Patent No.: US 10,315,766 B2
(45) Date of Patent: Jun. 11, 2019

(54) MONITOR AND ATTACHING-DETACHING DEVICE THEREFOR

(71) Applicant: Panasonic Intellectual Property Management Co., Ltd., Osaka (JP)

(72) Inventors: Kiyoshi Yokota, Osaka (JP); Kaname Tomita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/882,237

(22) Filed: Jan. 29, 2018

(65) Prior Publication Data

US 2018/0229845 A1 Aug. 16, 2018

Related U.S. Application Data

(60) Provisional application No. 62/452,527, filed on Jan. 31, 2017.

(51) Int. Cl.
*B64D 11/00* (2006.01)
*B60R 11/02* (2006.01)
*B60R 11/00* (2006.01)

(52) U.S. Cl.
CPC .... *B64D 11/00152* (2014.12); *B60R 11/0235* (2013.01); *B64D 11/00151* (2014.12);
(Continued)

(58) Field of Classification Search
None
See application file for complete search history.

(56) References Cited

U.S. PATENT DOCUMENTS 6,418,010 B1 * 7/2002 Sawyer ............... B60R 11/0235
248/918
9,038,877 B2 * 5/2015 Bijlholt .................. B60R 11/02
224/553
(Continued)

FOREIGN PATENT DOCUMENTS

JP 10-275025 10/1998

OTHER PUBLICATIONS

Extended European Search Report dated Mar. 19, 2018 in European Application No. 18153827.3.

*Primary Examiner* — Xanthia C Cunningham
(74) *Attorney, Agent, or Firm* — Wenderoth, Lind & Ponack, L.L.P.

(57) ABSTRACT

A monitor is configured to be detachably fixed to a wall surface and includes an attaching-detaching device configured to be positioned between the monitor and the wall surface and detachably fix the monitor to the wall surface. The attaching-detaching device includes a swing member having a distal end and a proximal end, a hinge mechanism configured to be attachable to the wall surface and support the proximal end of the swing member such that the distal end of the swing member is swingable toward or away from the wall surface, a swing member engagement portion on a rear surface of the monitor opposite to a display screen of the monitor, the swing member engagement portion being engaged with the swing member, and a lock mechanism on the rear surface of the monitor, the lock mechanism being configured to lock the swing member in engagement with the swing member engagement portion.

12 Claims, 19 Drawing Sheets

Second Position

(52) U.S. Cl.
CPC ............... *B60R 2011/0015* (2013.01); *B60R 2011/0085* (2013.01)

(56) References Cited

U.S. PATENT DOCUMENTS

| | | | |
|---|---|---|---|
| 9,511,862 B2* | 12/2016 | Thiele | B64D 11/00152 |
| 9,695,972 B1* | 7/2017 | Jiang | B64D 11/00152 |
| 10,017,125 B2* | 7/2018 | Frazier | B60R 11/02 |
| 2004/0262474 A1 | 12/2004 | Boks et al. | |
| 2006/0219857 A1* | 10/2006 | Satterfield | B60R 11/0235 |
| | | | 248/284.1 |
| 2009/0316057 A1 | 12/2009 | Campbell et al. | |
| 2012/0120626 A1* | 5/2012 | Akaike | B60R 11/02 |
| | | | 361/807 |
| 2012/0248833 A1* | 10/2012 | Hontz | B60N 3/004 |
| | | | 297/188.05 |
| 2016/0176357 A1* | 6/2016 | Maslakow | F16M 13/02 |
| | | | 224/275 |
| 2018/0118343 A1* | 5/2018 | Castaing | B64D 11/00152 |

\* cited by examiner

First Position

Second Position

Second Position

MONITOR AND ATTACHING-DETACHING DEVICE THEREFOR

CROSS-REFERENCE TO RELATED APPLICATIONS

The present application is a related application of U.S. Provisional Patent Application No. 62/452,527 filed on Jan. 31, 2017, and claims priority based on this provisional application, entirety of which is incorporated in the present specification by reference.

BACKGROUND OF INVENTION

1. Technical Field

The present disclosure relates to a monitor detachably fixed to a wall surface like a back surface of a passenger seat in a passenger mobile object such as an aircraft, and also relates to an attaching-detaching device therefor.

2. Description of Related Art

A passenger monitor equipped in a mobile object such as an aircraft, a bus, or a vessel configured to transport passengers is fixed to a back surface of a seat, an inner wall surface of an airframe, or the like. When being fixed to a seat, the passenger monitor is fixed via a tilt adjustment mechanism or the like.

The passenger monitor is fixed to a wall surface and is thus uneasily attached or detached, requiring time for maintenance and replacement. For example, the monitor fixed to a back surface of a seat via the tilt adjustment mechanism is hard to be detached because of necessity for partially disassembling the seat.

SUMMARY

In view of this, it is an object of the present disclosure to achieve easy attachment and detachment of a monitor to and from a wall surface.

In order to achieve the object mentioned above, according to an aspect of the present disclosure, there is provided
a monitor detachably fixed to a wall surface,
the monitor includes an attaching-detaching device disposed between the monitor and the wall surface and configured to detachably fix the monitor to the wall surface, and
the attaching-detaching device includes
a swing member having a distal end and a proximal end,
a hinge mechanism configured to be attachable to the wall surface and support the proximal end of the swing member such that the distal end of the swing member is swingable to approach or leave the wall surface,
a swing member engagement portion provided on a rear surface opposite to a display screen of the monitor and engaged with the swing member, and
a lock mechanism provided on the rear surface of the monitor and configured to unlockably lock the swing member being engaged with the swing member engagement portion.

According to another aspect of the present disclosure, there is provided
a monitor detachably fixed to a wall surface on which a hinge mechanism is fixed, the hinge mechanism configured to support a proximal end of a swing member such that a distal end of the swing member is swingable to approach or leave the wall surface, and the monitor includes:
a swing member engagement portion provided on a rear surface opposite to a display screen of the monitor and engaged with the swing member, and
a lock mechanism provided on the rear surface of the monitor and configured to unlockably lock the swing member being engaged with the swing member engagement portion.

According to still another aspect of the present disclosure, there is provided
an attaching-detaching device configured to detachably fix a monitor to wall surface, and the attaching-detaching device includes:
a swing member having a distal end and a proximal end,
a hinge mechanism configured to be attachable to the wall surface and support the proximal end of the swing member such that the distal end of the swing member is swingable to approach or leave the wall surface,
a swing member engagement portion configured to be attachable to a rear surface opposite to a display screen of the monitor and be engaged with the swing member; and
a lock mechanism configured to be attachable to the rear surface of the monitor and unlockably lock the swing member being engaged with the swing member engagement portion.

Such an aspect facilitates attachment and detachment of the monitor to and from the wall surface.

DETAILED DESCRIPTION

An embodiment will now be described in detail below with reference to the drawings appropriately. Unnecessary details may not be described herein. For example, the following description may not include detailed description of well-known matters and repeated description of substantially identical configurations. This is to avoid unnecessary redundancy in the following description and facilitate understanding of those skilled in the art.

The accompanying drawings and the following description are provided for full understanding of the present disclosure by those skilled in the art, and are not intended to limit the subject matter recited in the claims.

Figure 1:
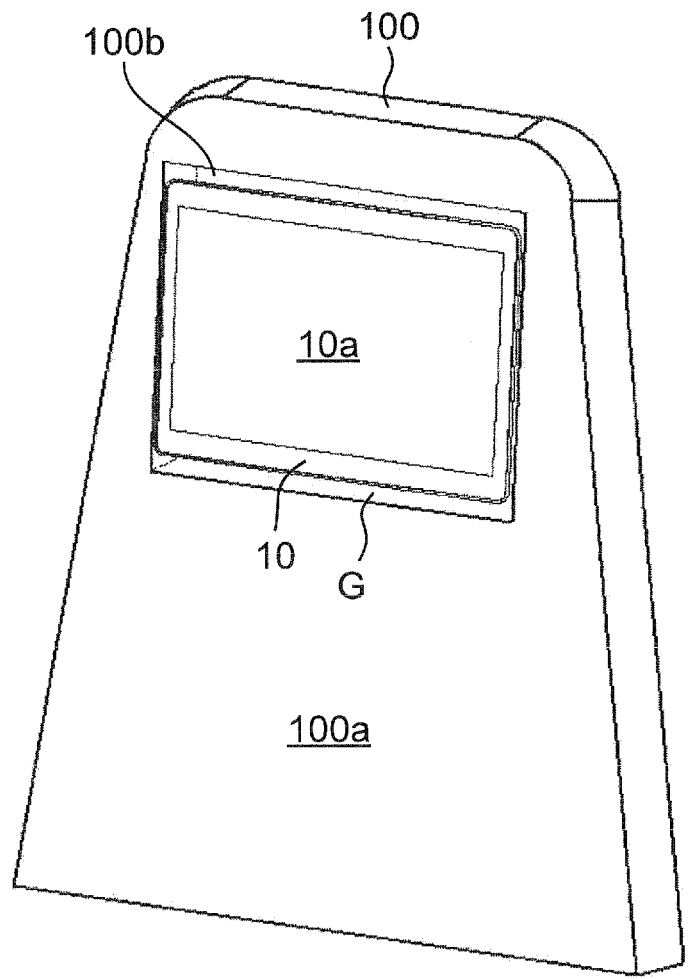
FIG. 1 is a perspective view of a monitor attached to a back surface of a seat.
Figure 1:
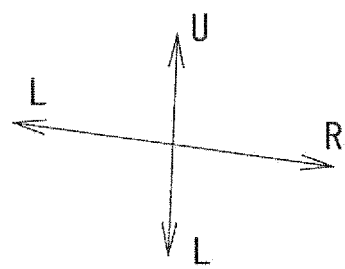
Figure 2:
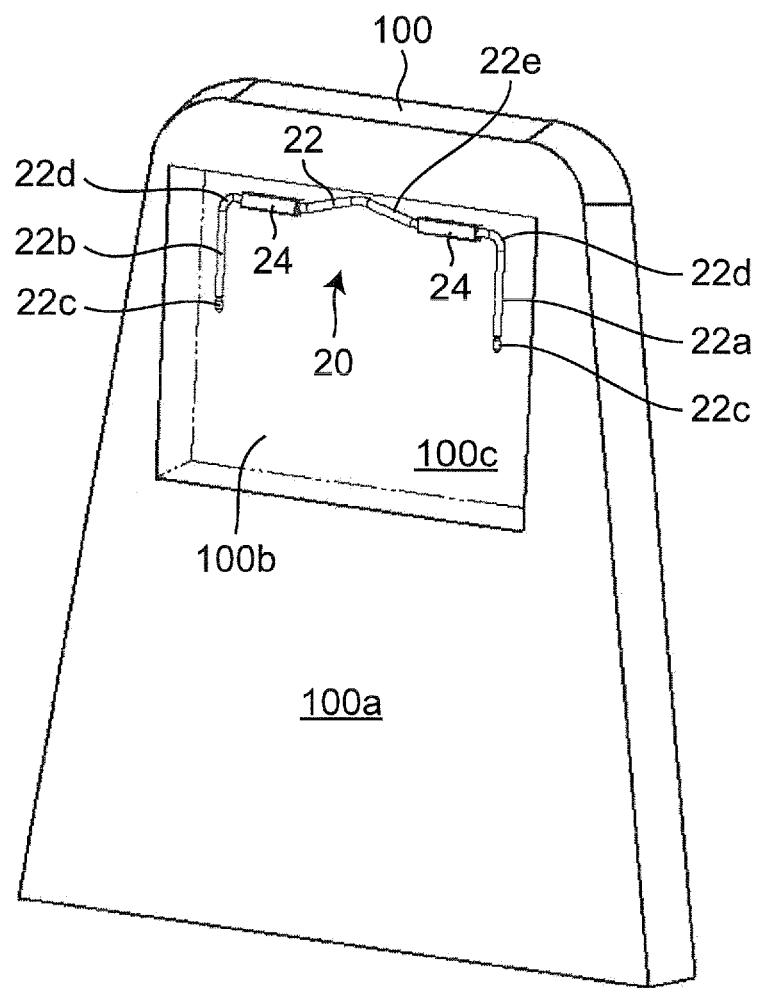
FIG. 2 is a perspective view of the back surface of the seat from which the monitor is removed.
Figure 2:
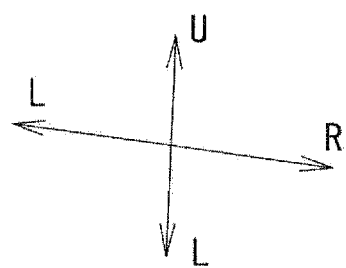

FIG. 1 depicts a back surface of a passenger seat to which a monitor according to an embodiment of the present disclosure is attached. FIG. 2 depicts the back surface of the passenger seat from which the monitor is removed. A passenger seat 100 shown in FIGS. 1 and 2 is equipped in a passenger aircraft or the like.

FIG. 1 depicts a monitor 10 including a display screen 10a. The display screen 10a is occasionally configured as a touch screen.

In the embodiment, the seat 100 has a back surface 100a provided with a monitor housing portion 100b as a recess to house the monitor 10. The monitor housing portion 100b has a monitor fixing surface (a bottom surface of the recess; for example, the bottom surface of the recess can be an inner wall surface) 100c to which the monitor 10 is detachably fixed via an attaching-detaching device 20. The attaching-detaching device 20 is disposed between the monitor 10 and the monitor fixing surface 100c, and is configured to detachably fix the monitor 10 to the monitor fixing surface 100c. The attaching-detaching device 20 will be described in detail below.

As shown in FIG. 2, the attaching-detaching device 20 includes a swing member 22 and a hinge mechanism 24 configured to swingably support the swing member 22. In the embodiment, the swing member 22 has first and second linear rod portions 22a and 22b extending in parallel with each other. Each of the first and second rod portions 22a and 22b is shaped like a round bar having a circular cross section, and has a distal end 22c and a proximal end 22d. Each of the first and second rod portions 22a and 22b can alternatively have a sectional shape other than the circular shape, and can have different sectional areas at different positions in its extending direction.

As shown in FIG. 2, the proximal end 22d of the first rod portion 22a and the proximal end 22d of the second rod portion 22b are coupled with each other by a coupling portion 22e in the swing member 22. The coupling portion 22e extends in a transverse direction LR of the monitor 10, and has a first end connected to the first rod portion 22a and a second end connected to the second rod portion 22b.

In the embodiment, the first and second rod portions 22a and 22b and the coupling portion 22e are provided integrally as a single component. The swing member 22 including the first and second rod portions 22a and 22b and the coupling portion 22e is exemplarily made of a metallic round bar member bent into a bracket-like shape. The swing member thus has higher rigidity than the swing member including separate members of the first and second rod portions 22a and 22b and the coupling portion 22e.

In the embodiment, as shown in FIG. 2, the hinge mechanism 24 of the attaching-detaching device 20 is fixed to an upper portion of the monitor fixing surface 100c of the monitor housing portion 100b of the seat 100. The hinge mechanism 24 supports the coupling portion 22e of the swing member 22 rotatably about a center line extending in the transverse direction LR of the monitor 10.

Figure 3A:
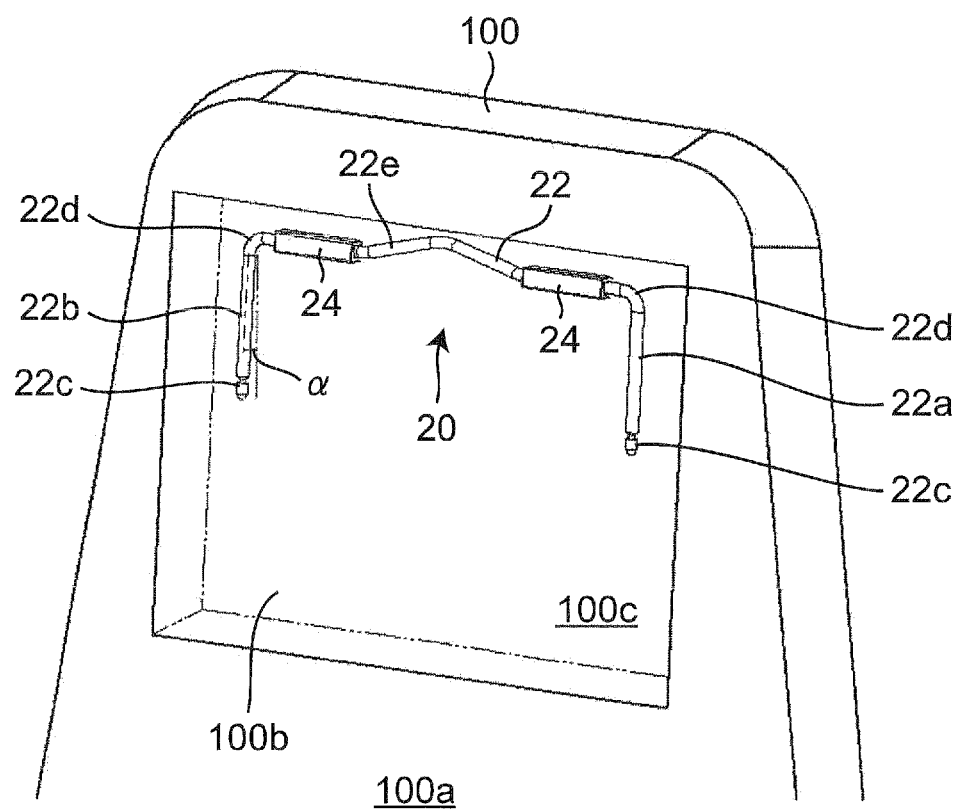
FIG. 3A is a perspective view of a swing member included in an attaching-detaching device and located at a first position.
Figure 3B:
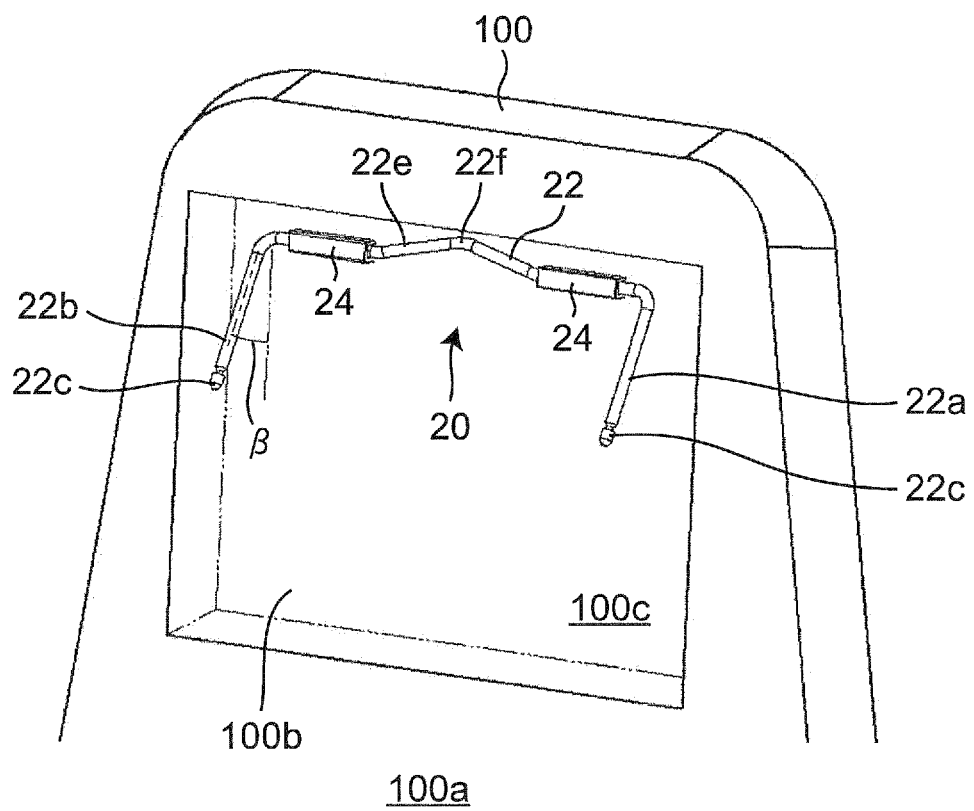
FIG. 3B is a perspective view of the swing member included in the attaching-detaching device and located at a second position.
Figure 4:
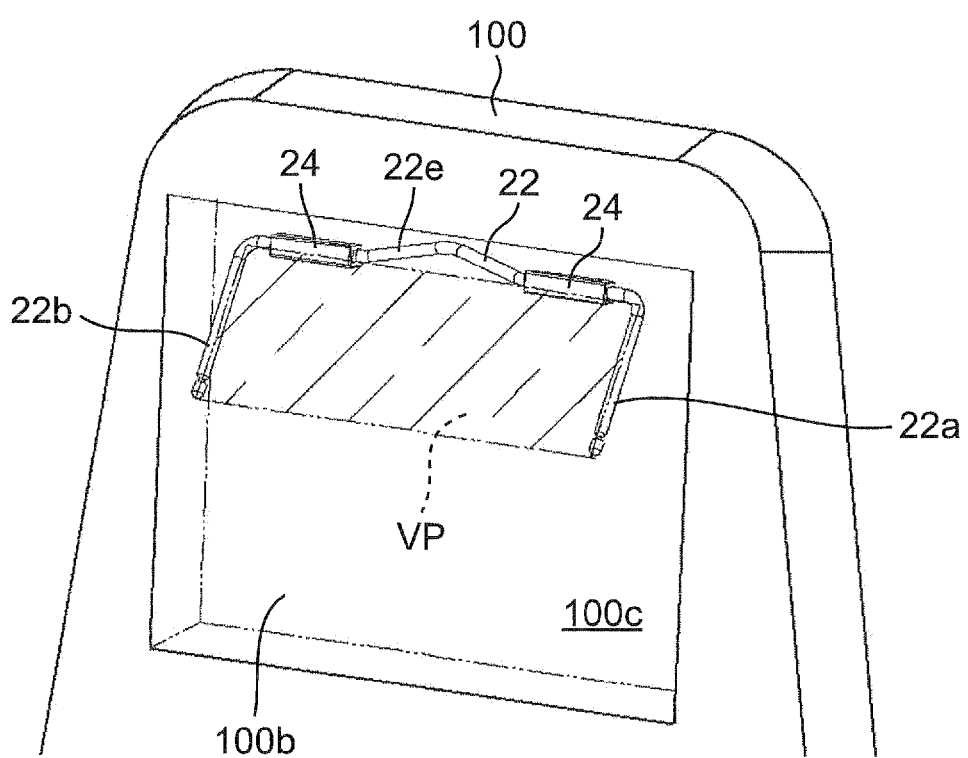
FIG. 4 is a perspective view of first and second rod portions included in the swing member and disposed on an identical plane.

As shown in FIGS. 3A and 3B, the swing member 22 is thus swingable such that the distal ends 22c of the first and second rod portions 22a and 22b approach or leave the monitor fixing surface 100c of the monitor housing portion 100b of the seat 100. As shown in FIG. 4, the first and second rod portions 22a and 22b are swingable in synchronization while being kept parallel with each other. In other words, the first and second rod portions 22a and 22b are positioned on an identical plane (virtual plane VP).

In the embodiment, the swing member 22 swings between a first position indicated in FIG. 3A and a second position indicated in FIG. 3B.

As to be described in detail later, when the swing member 22 is located at the first position as shown in FIG. 3A, the monitor 10 is entirely housed in the monitor housing portion 100b of the seat 100 as shown in FIG. 1. The distal ends 22c of the first and second rod portions 22a and 22b come closest to the monitor fixing surface 100c of the monitor housing portion 100b in this state. In the swing member 22 located at the first position, the first and second rod portions 22a and 22b and the monitor fixing surface 100c of the monitor housing portion 100b form an angle α having nearly or substantially zero degrees (the first and second rod portions are substantially parallel to the monitor fixing surface of the monitor housing portion). The first and second rod portions can alternatively be configured such that the distal ends rather than the proximal ends come closer to the monitor fixing surface of the monitor housing portion to form the angle α having negative degrees.

As to be described in detail later, when the swing member 22 is located at the second position as shown in FIG. 3B, most of the monitor 10 is substantially located outside the monitor housing portion 100b of the seat 100. The distal ends 22c of the first and second rod portions 22a and 22b are most distant from the monitor fixing surface 100c of the monitor housing portion 100b in this state. In the swing member 22 located at the second position, the first and second rod portions 22a and 22b and the monitor fixing surface 100c of the monitor housing portion 100b form an angle β that is larger than the angle α and exemplarily has 45 degrees.

Figure 5:
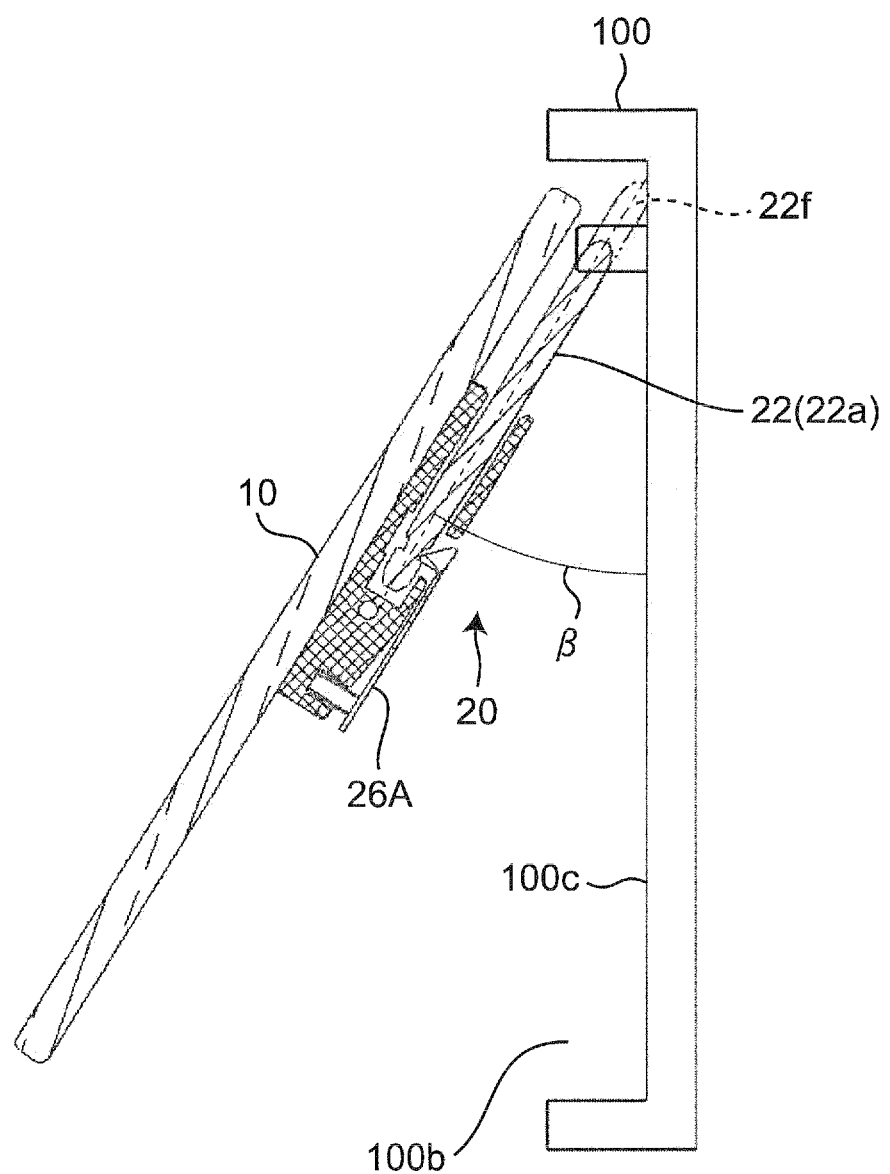
FIG. 5 is a sectional view of the attaching-detaching device with the swing member located at the second position.

In the embodiment, as shown in FIG. 3B, the swing member 22 has a stopper 22f located at the center of the coupling portion 22e and restricting a swingable range of the swing member 22. The stopper 22f is exemplarily provided by curving the center of the coupling portion 22e to project outward from a rotation center line of the coupling portion 22e. As shown in FIG. 5 depicting the monitor 10 viewed in the transverse direction LR, the stopper 22f comes into contact with the monitor fixing surface 100c of the monitor housing portion 100b of the seat 100 to restrict excessive swing of the swing member 22. The first and second rod portions 22a and 22b and the monitor fixing surface 100c of the monitor housing portion 100b form the maximum angle restricted to the angle β by the swing member 22.

Figure 6:
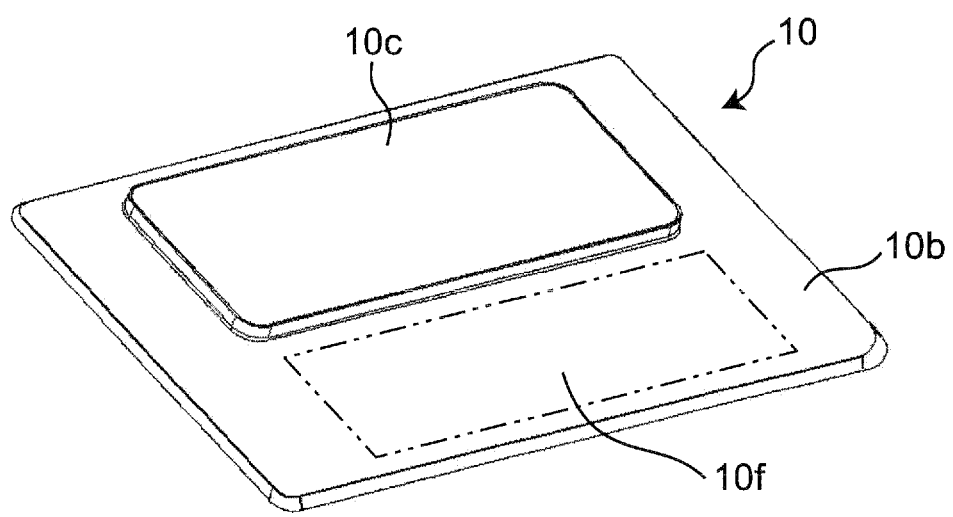
FIG. 6 is a perspective view of a rear surface of the monitor.
Figure 7:
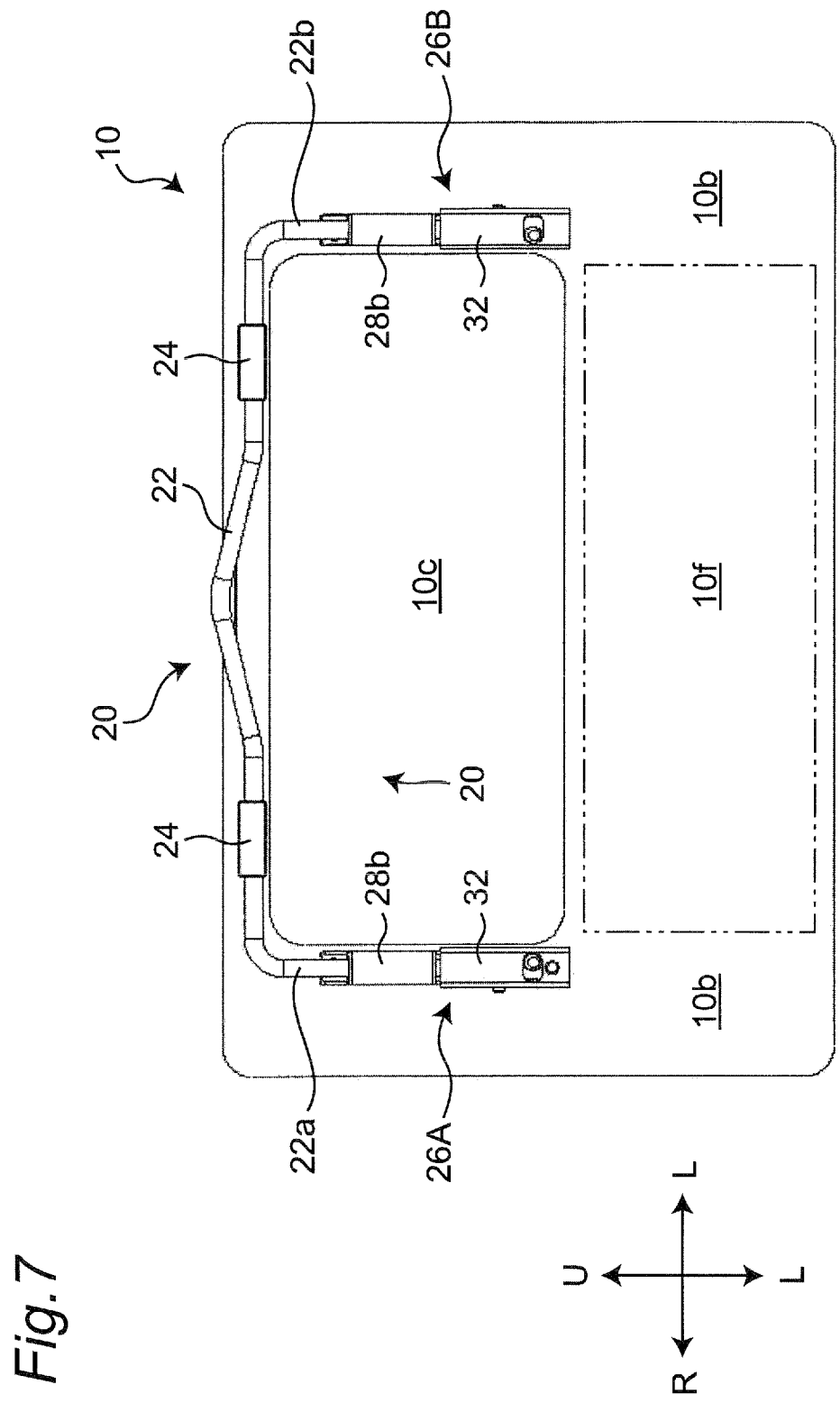
FIG. 7 is a view of first and second lock assemblies provided on the rear surface of the monitor and locking, by engagement, the first and second rod portions of the swing member.

FIGS. 6 and 7 depict a rear surface 10b of the monitor 10 opposite to the display screen 10a. In the embodiment, the rear surface 10b of the monitor 10 is provided with a projecting portion 10c accommodating a control board and the like of the monitor 10. As shown in FIG. 7, the attaching-detaching device 20 has a first lock assembly 26A located at a first end, in the transverse direction LR of the monitor 10, of the projecting portion 10c, and a second lock assembly 26B located at a second end of the projecting portion 10c. These two lock assemblies allow the monitor 10 to come closer to the monitor fixing surface 100c of the monitor housing portion 100b in comparison to a case where the lock assemblies are provided on the projecting portion. This configuration achieves smaller depth of the monitor housing portion 100b. Disposition of the lock assemblies 26A and 26B at the ends of the projecting portion 10c in the transverse direction LR of the display screen 10a enables substantially flat shapes of the projecting portion 10c and an area 10f positioned below the projecting portion 10c on the rear surface 10b of the monitor. This configuration prevents stress concentration due to impact from the display screen 10a of the monitor and achieves improved strength of the monitor, to satisfy required strength as an aircraft monitor. The monitor fixing surface 100c in contact with and supporting the rear surface 10b of the monitor against impact can also be shaped simply to follow the substantially flat shapes of the projecting portion 10c and the area 10f positioned below the projecting portion 10c on the rear surface 10b of the monitor.

As to be described in detail later, the first and second lock assemblies 26A and 26B are configured to lock, by engagement, the first and second rod portions 22a and 22b of the swing member 22, respectively.

Figure 8:
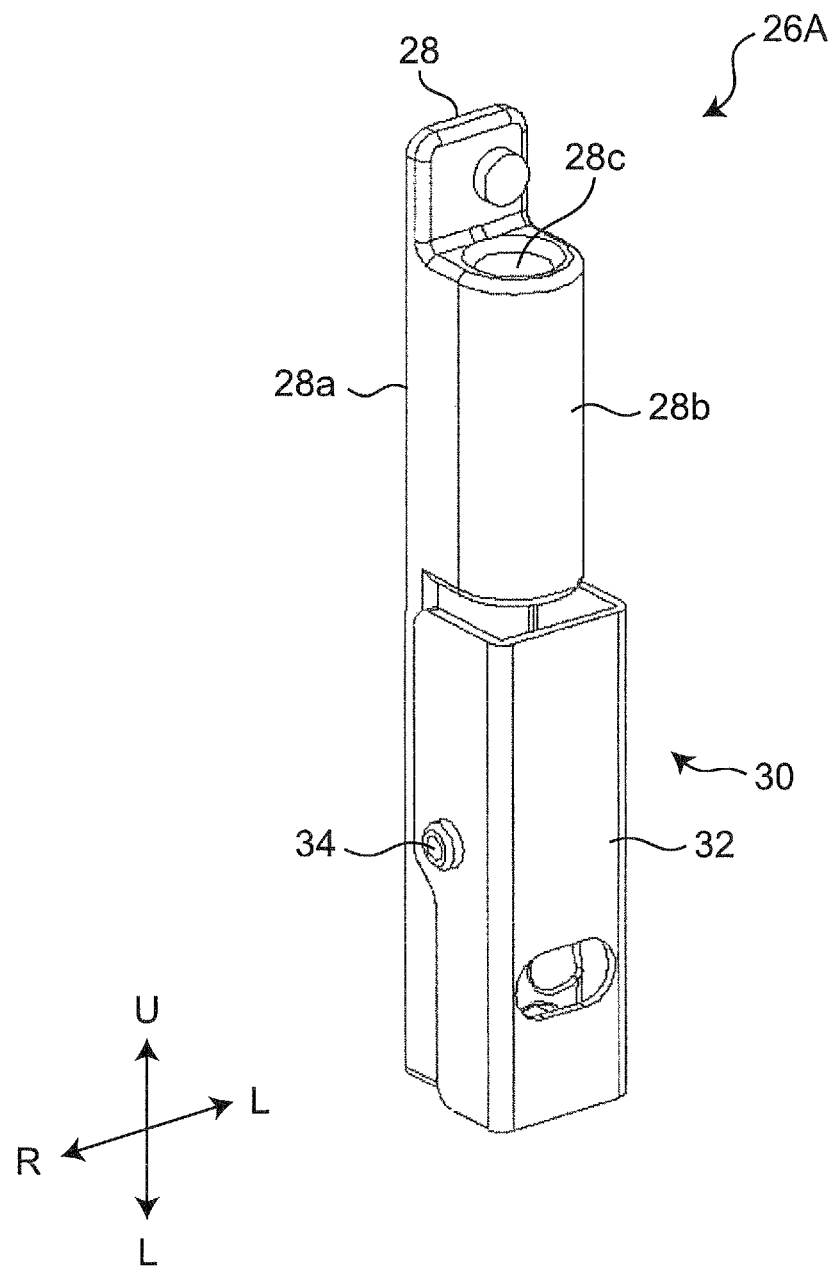
FIG. 8 is a perspective view of the first lock assembly.
Figure 9:
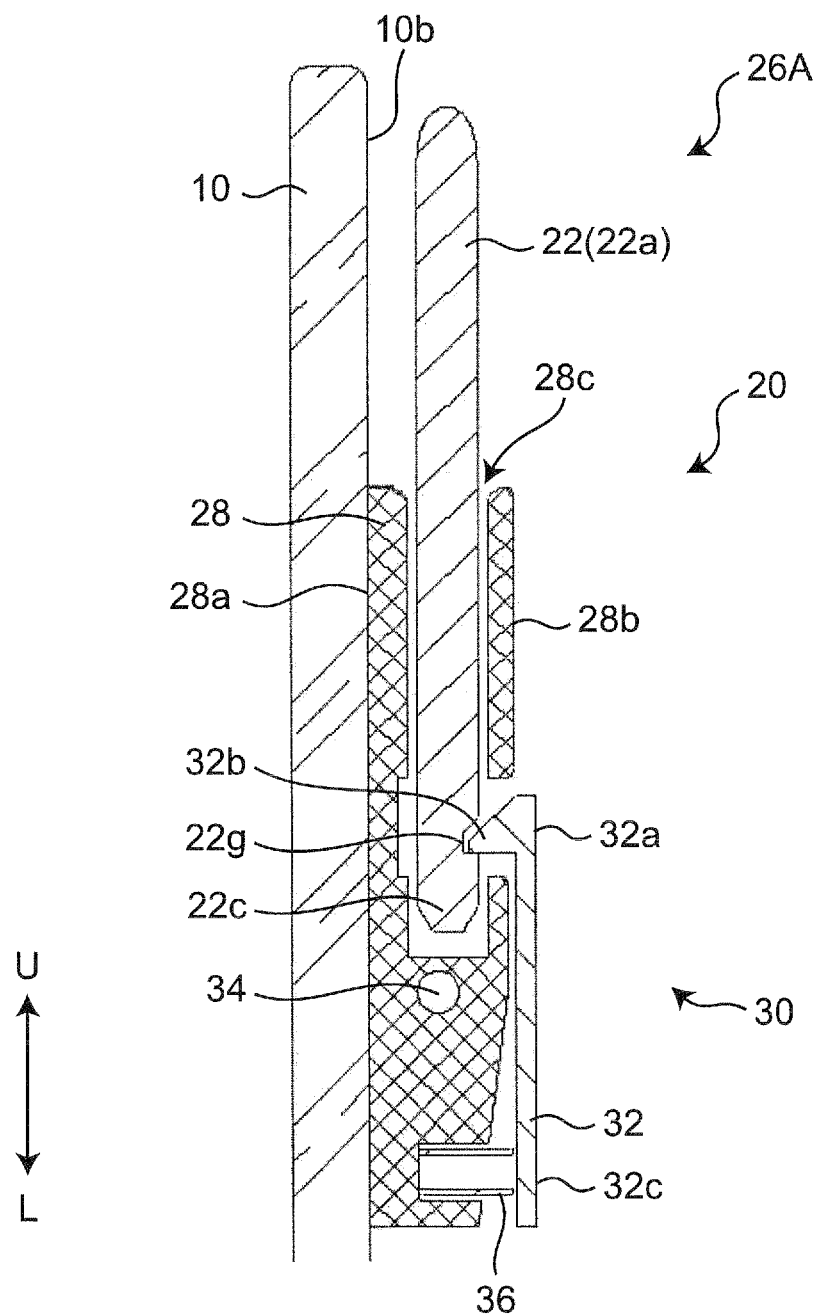
FIG. 9 is a sectional view of the first lock assembly.

FIG. 8 is a perspective view of the first lock assembly 26A, whereas FIG. 9 is a sectional view of the first lock assembly 26A. The first and second lock assemblies 26A and 26B are configured substantially identically. Accordingly, the first lock assembly 26A will be described in detail while the second lock assembly 26B will not be described herein.

In the embodiment, as shown in FIGS. 8 and 9, the first lock assembly 26A includes a base 28 having an attachment surface 28a attached to the monitor 10. The base 28 is provided with a swing member engagement portion 28b to be engaged with the first rod portion 22a of the swing member 22, and a lock mechanism 30 configured to unlockably lock the first rod portion 22a engaged with the swing member engagement portion 28b. The swing member engagement portion 28b and the lock mechanism 30 are provided integrally as the first lock assembly 26A, in the embodiment. The swing member engagement portion 28b and the lock mechanism 30 can alternatively be provided separately from each other. Still alternatively, the base 28 of the first lock assembly 26A can configure part of a casing of the monitor 10.

In the embodiment, as shown in FIGS. 8 and 9, the swing member engagement portion 28b in the first lock assembly 26A is configured by part of the base 28. The swing member engagement portion 28b has an engagement hole 28c allowing the first rod portion 22a of the swing member 22 to pass therethrough and penetrating in a vertical direction UL of the monitor 10. As shown in FIG. 9, the distal end 22c of the first rod portion 22a passes through the engagement hole 28c of the swing member engagement portion 28b.

As shown in FIG. 9, when the first rod portion 22a of the swing member 22 is engaged with the engagement hole 28c of the swing member engagement portion 28b, the first rod portion 22a extends substantially in parallel with the display screen 10a of the monitor 10 and is disposed on the rear surface 10b of the monitor 10. In other words, the virtual plane VP shown in FIG. 4 is provided substantially in parallel with the display screen 10a. The rod portion of the swing member exemplified herein is substantially parallel to the "display screen" of the monitor. The display screen and the rear surface of the monitor may occasionally not be provided in parallel with each other. In such a case, the swing member engagement portion can be disposed to allow the rod portion of the swing member to be substantially parallel to the "rear surface" of the monitor. The swing member engagement portion can still alternatively be disposed such that the first rod portion is not parallel to the "display screen" or the "rear surface" of the monitor but extends to form a predetermined angle with either one of the vertical and transverse directions of the monitor.

As shown in FIG. 9, the lock mechanism 30 is configured to lock the distal end 22c of the first rod portion 22a of the swing member 22 having passed through the swing member engagement portion 28b. The lock mechanism 30 thus includes a swing lever 32, a support pin 34 swingably supporting the swing lever 32, and a spring 36 biasing the swing lever 32.

The swing lever 32 is swingably supported by the support pin 34 extending in the transverse direction LR of the monitor 10, and swings like a seesaw about a center line extending in the transverse direction LR. The swing lever 32 has a first end 32a provided with a locking claw 32b caught in a narrowed portion 22g provided at the distal end 22c of the first rod portion 22a. The first rod portion 22a is locked (fixed) when the locking claw 32b is caught in the narrowed portion 22g. This configuration causes the monitor 10 to be fixed to the seat 100 with the first rod portion 22a and the swing member engagement portion 28b being kept engaged with each other, that is, the monitor 10 being postured constantly with respect to the swing member 22.

As shown in FIG. 9, the swing lever 32 has a second end 32c biased by the spring 36. Specifically, the spring 36 biases the second end of the swing lever 32 such that the locking claw 32b approaches to be caught in the narrowed portion 22g of the first rod portion 22a. In the embodiment, the spring 36 biases the second end 32c of the swing lever 32 to be distant from the rear surface 10b of the monitor 10. The spring 36 causes the locking claw 32b to keep locking the first rod portion 22a.

When the second end 32c of the swing lever 32 is kept pressed against biasing force of the spring 36, the locking claw 32b is kept distant from the narrowed portion 22g of the first rod portion 22a to cause the lock mechanism 30 to unlock the first rod portion 22a. The first rod portion 22a can thus leave the swing member engagement portion 28b to allow the monitor 10 to be detached from the seat 100.

Described above is the configuration of the attaching-detaching device 20 configured to detachably fix the monitor 10 to the back surface 100a of the seat 100. Described below are attaching and detaching the monitor 10 to and from the back surface 100a of the seat 100 with use of the attaching-detaching device 20.

FIGS. 10A to 10D depict processes of attaching to a wall surface (the back surface 100a of the seat 100) with use of the attaching-detaching device 20. FIGS. 10A to 10D depict the monitor 10 viewed in the transverse direction LR.

Figure 10A:
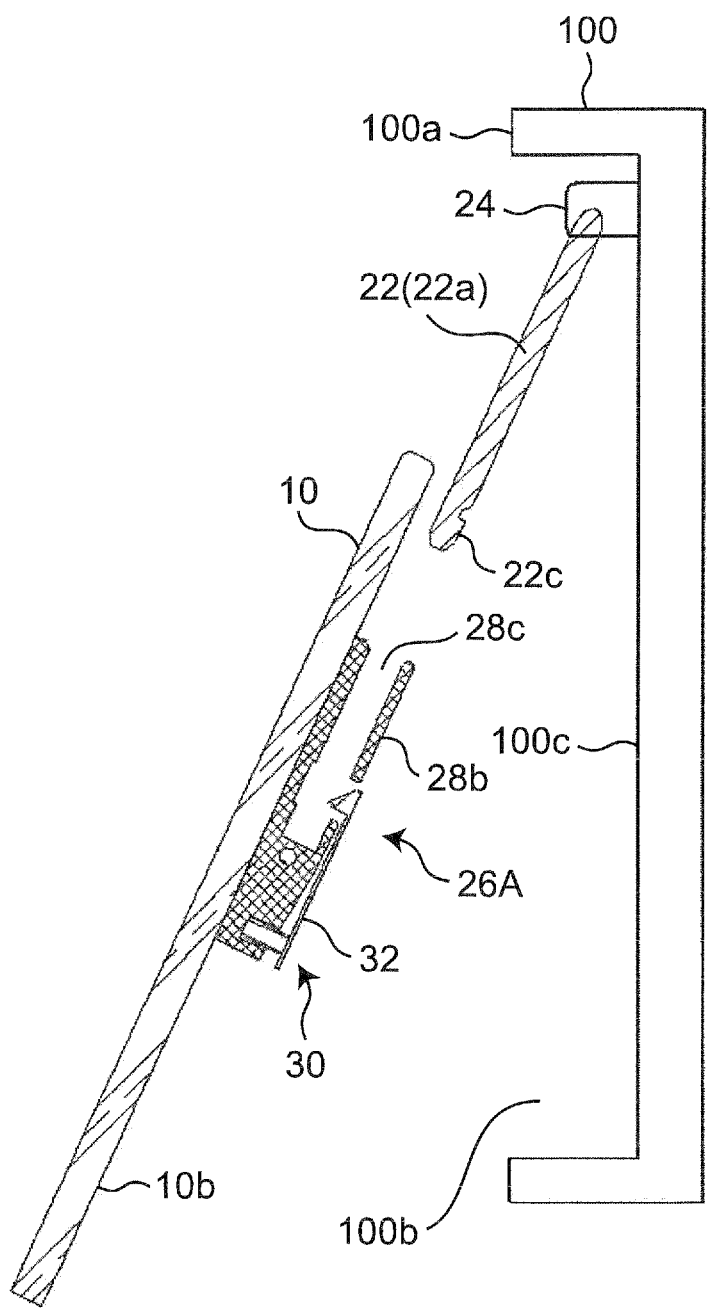
FIG. 10A is an explanatory view of a process of attaching the monitor to the back surface of the seat with use of the attaching-detaching device.

As shown in FIG. 10A, the swing member 22 is initially swung such that the distal ends 22c of the first and second rod portions 22a and 22b become distant from the monitor fixing surface 100c of the monitor housing portion 100b. For example, the first and second rod portions 22a and 22b and the monitor fixing surface 100c form an angle equal or approximate to the angle β indicated in FIGS. 3B and 5.

Figure 10B:
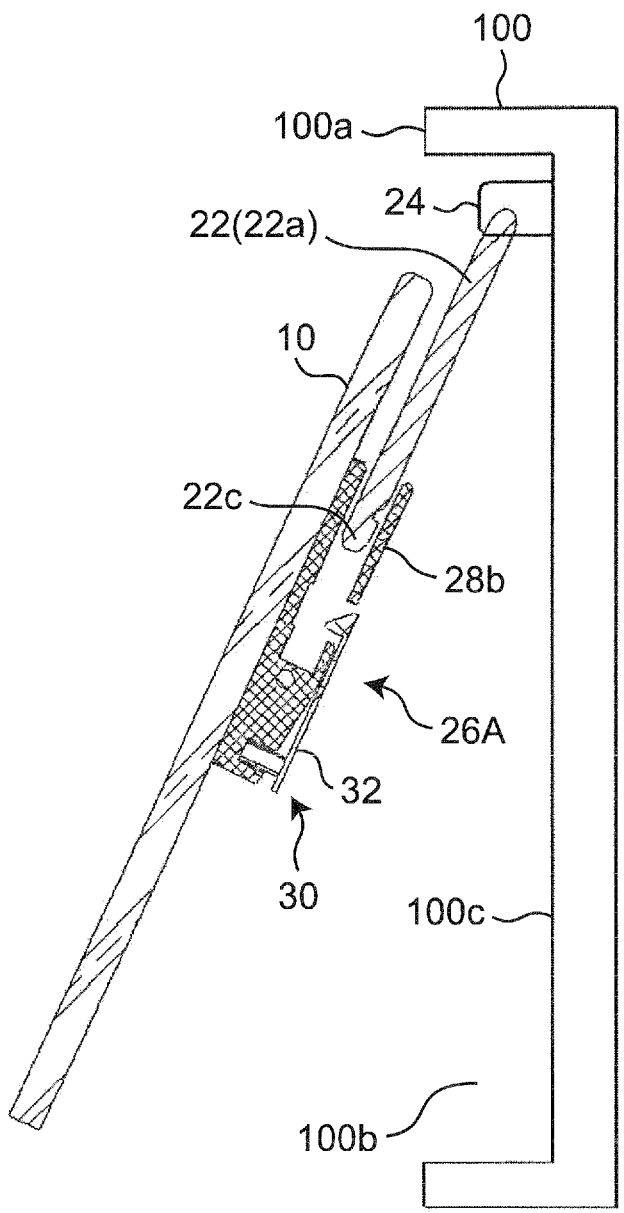
FIG. 10B is an explanatory view of a process of attaching the monitor to the back surface of the seat with use of the attaching-detaching device.

As shown in FIG. 10B, the distal end 22c of the first rod portion 22a in the swing member 22 is subsequently inserted to the engagement hole 28c of the swing member engagement portion 28b in the first lock assembly 26A. Simultaneously, the distal end 22c of the second rod portion 22b is inserted to the engagement hole of the swing member engagement portion in the second lock assembly 26B. The first and second rod portions 22a and 22b are parallel to each other in this state, and are thus easily inserted to the corresponding engagement holes simultaneously.

Figure 10C:
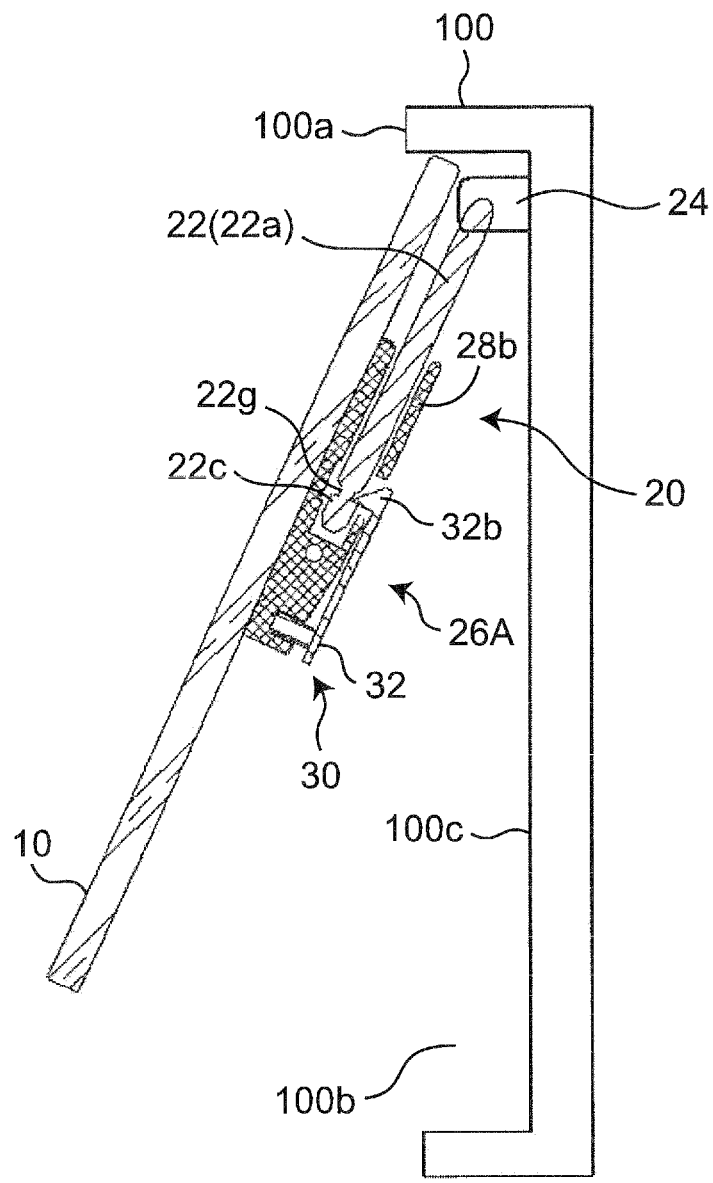
FIG. 10C is an explanatory view of a process of attaching the monitor to the back surface of the seat with use of the attaching-detaching device.

When the monitor 10 is shifted upward after the insertion, the locking claw 32b of the lock mechanism 30 in the first lock assembly 26A is caught in the narrowed portion 22g of the first rod portion 22a in the swing member 22 as shown in FIG. 10C. The first rod portion 22a is thus locked to the lock mechanism 30 in the first lock assembly 26A. Simultaneously, the locking claw of the lock mechanism in the second lock assembly 26B is caught in the narrowed portion of the second rod portion 22b in the swing member 22. The second rod portion 22b is thus locked to the lock mechanism in the second lock assembly 26B. The monitor 10 is accordingly fixed to the swing member 22 via the first and second lock assemblies 26A and 26B.

As the monitor 10 fixed to the swing member 22 is pressed toward the seat 100, the distal ends 22c of the first and second rod portions 22a and 22b approach the monitor fixing surface 100c. When the first and second rod portions 22a and 22b are closest to the monitor fixing surface 100c, the monitor is housed in the monitor housing portion 100b of the seat 100 and is completely fixed to the back surface 100a of the seat 100 as shown in FIG. 10D.

Figure 10D:
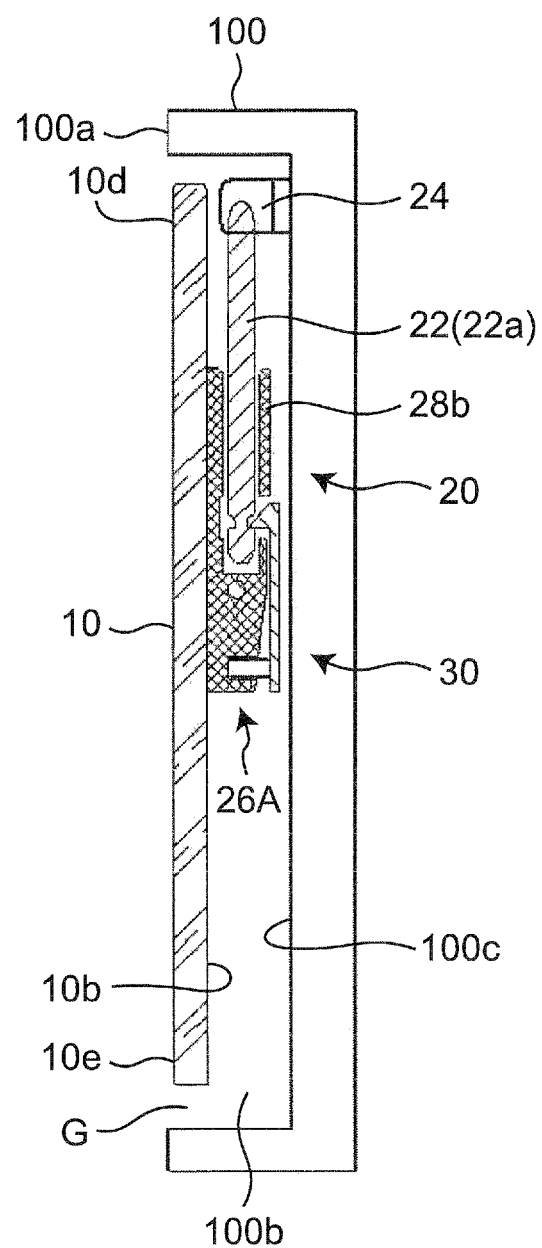
FIG. 10D is an explanatory view of a process of attaching the monitor to the back surface of the seat with use of the attaching-detaching device.

When the monitor 10 is fixed to the back surface 100a of the seat 100, in other words, when the monitor 10 is housed in the monitor housing portion 100b of the seat 100, the hinge mechanism 24 is positioned above the swing member engagement portion 28b in each of the first and second lock assemblies 26A and 26B and the lock mechanism 30 is positioned below the swing member engagement portion 28b, as shown in FIG. 10D. This disposition achieves a shorter distance between the monitor 10 and the monitor fixing surface 100c of the monitor housing portion 100b.

As shown in FIG. 10D, the entire attaching-detaching device 20 is disposed between the monitor 10 and the monitor fixing surface 100c of the monitor housing portion 100b. The attaching-detaching device 20 thus disposed is invisible to a passenger viewing the monitor 10 and inhibits unnecessary access by the passenger.

Described next are processes of detaching the monitor 10 fixed to the back surface 100a of the seat 100 as shown in FIG. 10D.

Figure 11A:
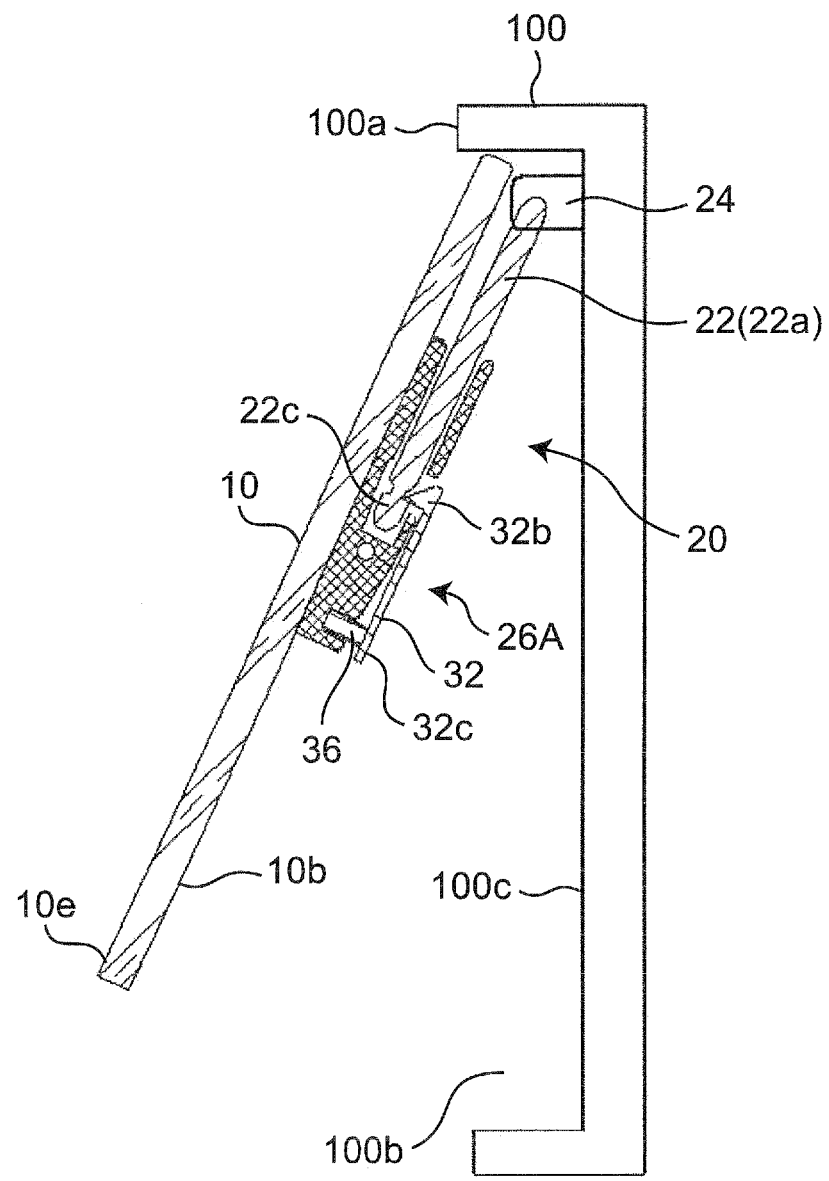
FIG. 11A is an explanatory view of a process of detaching the monitor from the back surface of the seat.

As shown in FIG. 10D, the hinge mechanism 24 of the attaching-detaching device 20 is initially positioned adjacent to an upper end 10d of the monitor 10. As shown in FIG. 10D (and FIG. 1), there is a gap G provided between a lower end 10e of the monitor 10 and the back surface 100a of the seat 100 and allowing entry of an operator's finger. The operator can thus catch the lower end 10e of the monitor 10 with a finger and shift the lower end 10e forward or backward, to shift (swing) the monitor 10 to get out of the monitor housing portion 100b of the seat 100, as shown in FIG. 11A. The monitor 10 located outside the monitor housing portion 100b enables access to the swing lever 32 in the lock mechanism 30 of each of the first and second lock assemblies 26A and 26B provided on the rear surface 10b of the monitor 10 (i.e. enables detachment of the monitor 10 from the seat 100).

The passenger viewing the monitor 10 catches the lower end 10e of the monitor 10 with a finger to shift the lower end 10e forward or backward to adjust a tilt angle of the monitor 10 as desired. The attaching-detaching device 20 serves as a tilt adjustment mechanism. The attaching-detaching device 20 is attached to an upper portion of the rear surface 10b distant from the lower end 10e of the monitor 10 in this state, inhibiting the passenger adjusting the tilt angle from touching the attaching-detaching device 20, particularly the swing lever 32 of each of the first and second lock assemblies 26A and 26B.

The swing member 22 of the attaching-detaching device 20 inhibits deformation of the monitor 10 while the passenger is adjusting the tilt angle of the monitor 10. The monitor 10 having a thin tabular shape is likely to have flexural deformation while the passenger is adjusting the tilt angle. The swing member 22 is attached to the rear surface 10b of the monitor 10 via the first and second lock assemblies 26A and 26B so as to be integrated with the monitor 10 for higher rigidity against flexural deformation of the monitor 10.

Figure 11B:
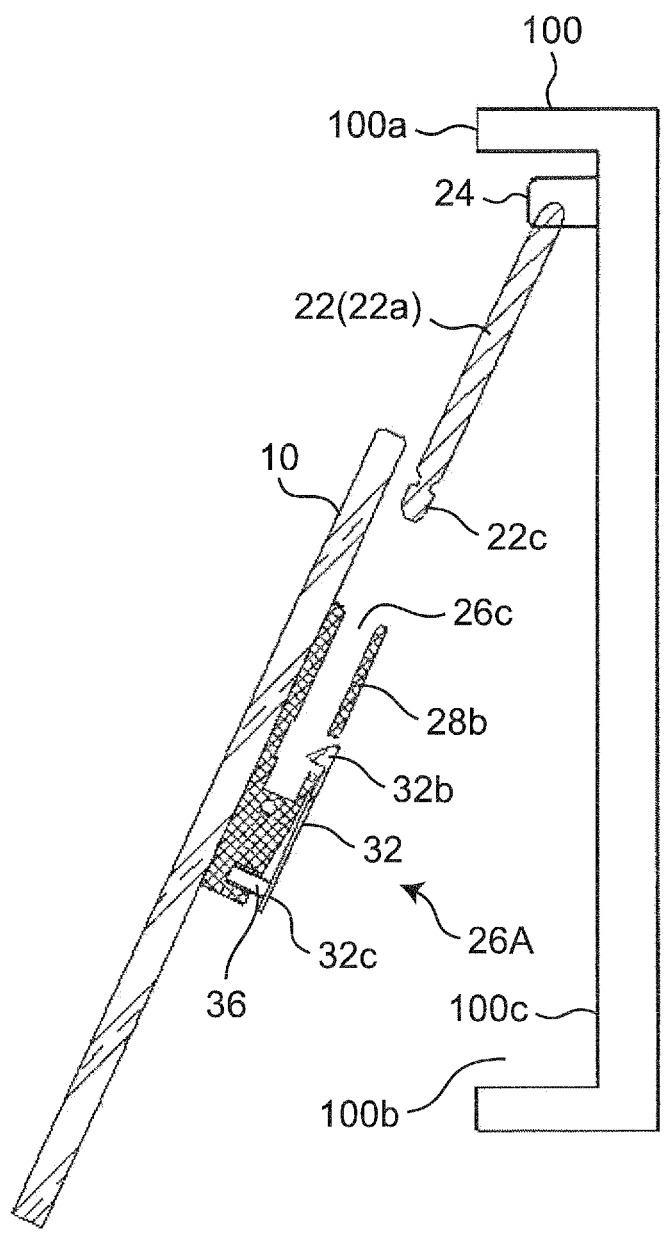
FIG. 11B is an explanatory view of a process of detaching the monitor from the back surface of the seat.

As shown in FIG. 11A, with a lower portion of the monitor 10 being located outside the monitor housing portion 100b of the seat 100, the second end 32c of the swing lever 32 in the first lock assembly 26A is kept pressed against the biasing force of the spring 36. The second end of the swing lever in the second lock assembly 26B is similarly kept pressed simultaneously. Specifically, the operator keeps operating the swing lever 32 of the first lock assembly 26A with a finger of the right hand and keeps operating the swing lever 32 of the second lock assembly 26B with a finger of the left hand. Accordingly, the first lock assembly 26A unlocks the first rod portion 22a and the second lock assembly 26B unlocks the second rod portion 22b simultaneously. When the monitor 10 unlocked at these two positions is slid downward, the monitor 10 is detached from the seat 100 as shown in FIG. 11B (the monitor unlocked at only one of the positions cannot be detached from the seat).

The present embodiment described above facilitates attachment and detachment of the monitor to and from the back surface of the seat.

The above embodiment is exemplarily described as an embodiment of the present disclosure. The embodiment of the present disclosure is, however, not limited to the above embodiment.

Figure 12A:
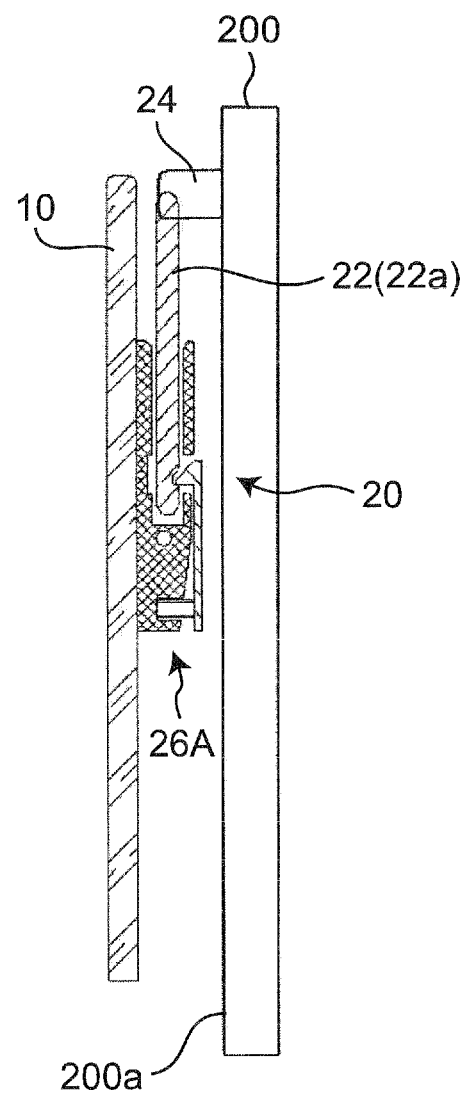
FIG. 12A is a view of the monitor attached to a back surface of a different seat with use of the attaching-detaching device.
Figure 12B:
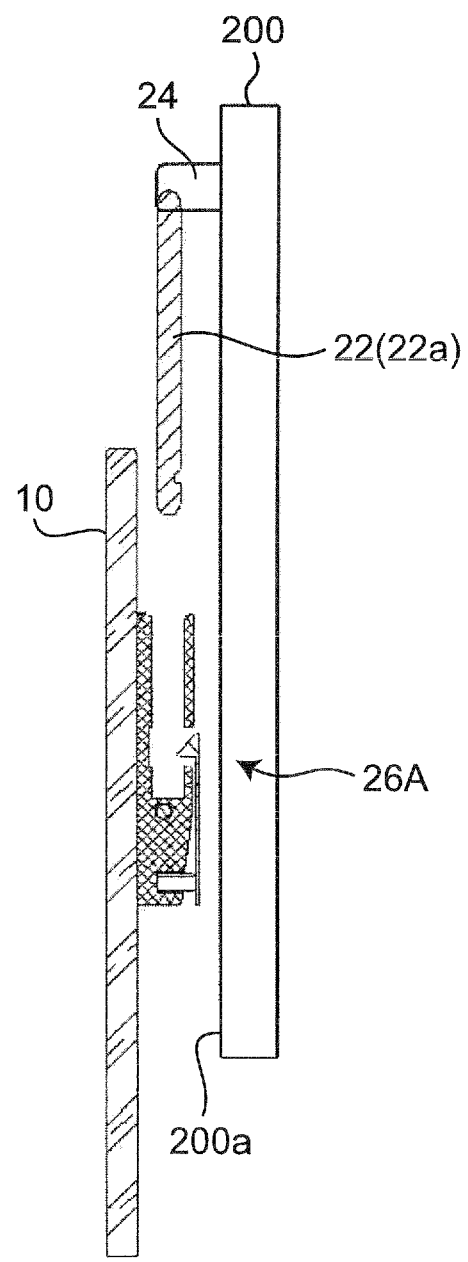
FIG. 12B is a view of a state where the monitor is detached from the back surface of the different seat.

For example, the monitor 10 according to the above embodiment is housed in the recessed monitor housing portion 100b provided in the back surface 100a of the seat 100, as shown in FIG. 1. As exemplarily shown in FIGS. 12A and 12B, the monitor 10 can alternatively be fixed, via the attaching-detaching device 20, to a flat back surface 200a of a seat 200 having no recess. As shown in FIG. 12B, the monitor 10 can be attached to the seat 200 with the swing member 22 extending in parallel with the back surface 200a of the seat 200 in this case. The monitor 10 according to the embodiment of the present disclosure is fixed, via the attaching-detaching device 20, to the back surface of the seat as well as various wall surfaces including an inner wall surface of an airframe of a passenger mobile object like an airplane, a bus, or a vessel configured to transport passengers.

According to the above embodiment, the first lock assembly 26A locks the first rod portion 22a in the swing member 22 of the attaching-detaching device 20 whereas the second lock assembly 26B locks the second rod portion 22b as shown in FIG. 7. The attaching-detaching device 20 is configured to lock at the two positions independently from each other. The embodiment of the present disclosure is, however, not limited to this configuration. The attaching-detaching device can alternatively be configured to lock at only one position.

Figure 13:
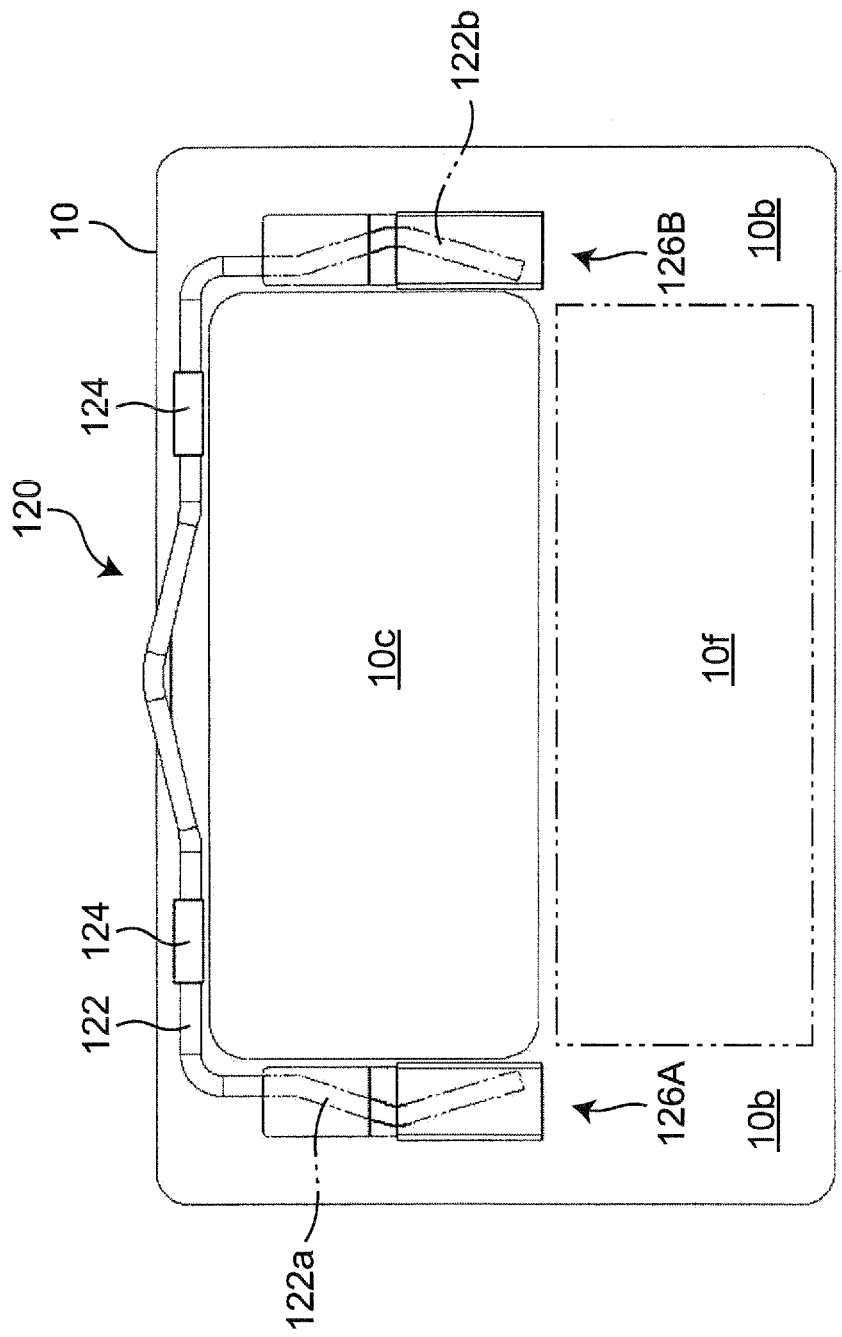
FIG. 13 is a view of an attaching-detaching device according to another embodiment, attached to a rear surface of a monitor.

The swing member 22 of the attaching-detaching device 20 according to the above embodiment has the bracket-like shape and includes the two linear rod portions 22a and 22b. The embodiment of the present disclosure is, however, not limited to this configuration. According to another embodiment as exemplarily shown in FIG. 13, an attaching-detaching device 120 includes a bracket-like swing member 122, a hinge mechanism 124 configured to swingably support the swing member 122, a first lock assembly 126A configured to lock a first rod portion 122a of the swing member 122, and a second lock assembly 126B configured to lock a second rod portion 122b. The first and second rod portions 122a and 122b are not linear but are bent. A swing member according to still another embodiment can have a plate-like shape instead of a bar shape.

According to the above embodiment, the monitor 10 fixed to a wall surface via the attaching-detaching device 20 swings such that the lower end 10e approaches or leaves the back surface 100a of the seat 100 as shown in FIG. 11A. The embodiment of the present disclosure is, however, not limited to this configuration. For example, an attaching-detaching device can be configured to swing the monitor such that one of the upper end, the right end, and the left end approaches or leaves the wall surface.

In a broad sense, an attaching-detaching device according to the embodiment of the present disclosure includes a swing member having a distal end and a proximal end, a hinge mechanism configured to be attachable to a wall surface and support the proximal end of the swing member such that the distal end of the swing member is swingable to approach or leave the wall surface, a swing member engagement portion provided on (or configured to be attachable to) a rear surface opposite to a display screen of a monitor and engaged with the swing member, and a lock mechanism provided on (or configured to be attachable to) the rear surface of the monitor and configured to unlockably lock the swing member being engaged with the swing member engagement portion.

The embodiments have been described above to exemplify the technique of the present invention. The accompanying drawings and the detailed description have been provided for this purpose. The constituent elements shown in the accompanying drawings and mentioned in the detailed description thus possibly include constituent elements essential for achievement of the object as well as constituent elements inessential for achievement of the object but mentioned for exemplification of the technique. Accordingly, depiction in the accompanying drawings or mention in the detailed description of such inessential constituent elements should not lead directly to recognition of the inessential constituent elements as being essential.

The above embodiment exemplifies the technique of the present invention and can thus have modification, replacement, addition, exclusion, and the like in various manners within the scope of the claims or a scope equivalent thereto.

The invention claimed is:

1. A monitor configured to be detachably fixed to a wall surface, the monitor comprising:
   an attaching-detaching device configured to be positioned between the monitor and the wall surface and detachably fix the monitor to the wall surface,
   the attaching-detaching device including:
   a swing member having a distal end and a proximal end,
   a hinge mechanism configured to be attachable to the wall surface and support the proximal end of the swing member such that the distal end of the swing member is swingable toward or away from the wall surface,
   a swing member engagement portion on a rear surface of the monitor opposite to a display screen of the monitor, the swing member engagement portion being engaged with the swing member such that the distal end of the swing member is inserted into the swing member engagement portion, and
   a lock mechanism on the rear surface of the monitor, the lock mechanism being configured to lock the swing member in engagement with the swing member engagement portion.

2. The monitor according to claim 1, wherein:
   the swing member is swingably supported by the hinge mechanism about a center line extending in a transverse direction of the monitor,
   the swing member engagement portion has an engagement hole configured to allow the swing member to extend therethrough in a vertical direction of the monitor, and
   the lock mechanism is configured to lock the distal end of the swing member which extends through the engagement hole of the swing member engagement portion.

3. The monitor according to claim 2, wherein, when the monitor is fixed to the wall surface via the attaching-detaching device and the distal end of the swing member is closest to the wall surface, the hinge mechanism is positioned adjacent to an upper end of the monitor in the vertical direction of the monitor, the swing member engagement portion is positioned below the hinge mechanism, and the lock mechanism is positioned below the swing member engagement portion.

4. The monitor according to claim 3, wherein, when the monitor is fixed to the wall surface via the attaching-detaching device and the distal end of the swing member is closest to the wall surface, an entirety of the attaching-detaching device is positioned between the monitor and the wall surface.

5. The monitor according to claim 3, wherein, when the monitor is fixed to the wall surface via the attaching-detaching device and the distal end of the swing member is closest to the wall surface, an entirety of the attaching-detaching device is positioned in an upper portion of the rear surface of the monitor.

6. The monitor according to claim 1, wherein the wall surface constitutes a back surface of a passenger seat in a passenger aircraft.

7. A monitor configured to be detachably fixed to a wall surface on which a hinge mechanism is fixed, the hinge mechanism being configured to support a proximal end of a swing member such that a distal end of the swing member is swingable toward or away from the wall surface, the monitor comprising:
   a swing member engagement portion on a rear surface of the monitor opposite to a display screen of the monitor, the swing member engagement portion being engaged with the swing member such that the distal end of the swing member is inserted into the swing member engagement portion; and
   a lock mechanism on the rear surface of the monitor, the lock mechanism being configured to lock the swing member in engagement with the swing member engagement portion.

8. An attaching-detaching device configured to detachably fix a monitor to a wall surface, the attaching-detaching device comprising:
  a swing member having a distal end and a proximal end;
  a hinge mechanism configured to be attachable to the wall surface and support the proximal end of the swing member such that the distal end of the swing member is swingable toward or away from the wall surface;
  a swing member engagement portion configured to be attachable to a rear surface of the monitor opposite to a display screen of the monitor and be engaged with the swing member such that the distal end of the swing member is inserted into the swing member engagement portion; and
  a lock mechanism configured to be attachable to the rear surface of the monitor and lock the swing member in engagement with the swing member engagement portion.

9. A monitor configured to be detachably fixed to a wall surface, the monitor comprising:
  an attaching-detaching device configured to be positioned between the monitor and the wall surface and detachably fix the monitor to the wall surface,
  the attaching-detaching device including:
  a swing member having a distal end and a proximal end,
  a hinge mechanism configured to be attachable to the wall surface and support the proximal end of the swing member such that the distal end of the swing member is swingable toward or away from the wall surface,
  a swing member engagement portion on a rear surface of the monitor opposite to a display screen of the monitor, the swing member engagement portion being engaged with the swing member, and
  a lock mechanism on the rear surface of the monitor, the lock mechanism being configured to lock the swing member in engagement with the swing member engagement portion, wherein:
  the swing member includes a first rod portion, a second rod portion, and a coupling portion,
  the first rod portion and the second rod portion are positioned on an identical plane and each of the first rod portion and the second rod portion has a distal end and a proximal end,
  the coupling portion extends in a transverse direction of the monitor and is configured to couple the proximal end of the first rod portion and the proximal end of the second rod portion,
  the hinge mechanism is configured to support the coupling portion such that the first rod portion and the second rod portion are simultaneously swingable,
  the swing member engagement portion includes a first swing member engagement portion configured to be engaged with the first rod portion and a second swing member engagement portion configured to be engaged with the second rod portion, and
  the lock mechanism includes a first lock mechanism configured to lock the first rod portion and a second lock mechanism configured to lock the second rod portion.

10. The monitor according to claim 9, wherein the first rod portion, the second rod portion, and the coupling portion are integrated as a single component.

11. The monitor according to claim 9, wherein:
  the first swing member engagement portion and the first lock mechanism are integrated as a first lock assembly, and
  the second swing member engagement portion and the second lock mechanism are integrated as a second lock assembly.

12. The monitor according to claim 11, wherein:
  the rear surface of the monitor has a projecting portion,
  the first lock assembly is positioned at a first end of the projecting portion, and
  the second lock assembly is positioned at a second end of the projecting portion.

* * * * *